United States Patent
Gray, Jr.

(10) Patent No.: US 8,306,682 B2
(45) Date of Patent: Nov. 6, 2012

(54) METHODS FOR OPTIMIZING THE EFFICIENCY OF A SERIES HYBRID VEHICLE WITH MULTI-GEAR TRANSMISSION

(75) Inventor: Charles L. Gray, Jr., Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 447 days.

(21) Appl. No.: 12/654,321

(22) Filed: Dec. 17, 2009

(65) Prior Publication Data

US 2011/0153129 A1    Jun. 23, 2011

(51) Int. Cl.
 *B60W 20/00* (2006.01)
 *F16H 37/06* (2006.01)
 *G06F 19/00* (2006.01)
(52) U.S. Cl. .............. 701/22; 701/55; 701/61; 477/5
(58) Field of Classification Search .............. 701/22, 701/55, 56, 61; 477/5, 115, 97; 903/945
 See application file for complete search history.

(56) References Cited

U.S. PATENT DOCUMENTS

| | | | |
|---|---|---|---|
| 5,245,541 A * | 9/1993 | Tomomatsu et al. | 701/56 |
| 6,360,155 B1 * | 3/2002 | Taffin et al. | 701/57 |
| 7,463,962 B2 | 12/2008 | Brunemann | |
| 7,678,014 B2 * | 3/2010 | Nohara et al. | 477/15 |
| 2001/0003807 A1 * | 6/2001 | Lee | 701/51 |
| 2006/0167610 A1 * | 7/2006 | Reinards et al. | 701/56 |
| 2007/0105679 A1 * | 5/2007 | Tabata et al. | 475/5 |
| 2009/0036267 A1 * | 2/2009 | Bellinger | 477/97 |
| 2010/0305822 A1 * | 12/2010 | Kresse et al. | 701/56 |

* cited by examiner

*Primary Examiner* — Tan Q Nguyen
(74) *Attorney, Agent, or Firm* — David H. Read

(57) ABSTRACT

In a series hybrid vehicle, a system for determining a shift schedule for shifting a multi-gear transmission connected to a drive means is disclosed. A vehicle operator selects among a plurality of shift styles respectively representing a plurality of shift schedules variously optimized for performance or fuel economy. A performance-based shift schedule favors providing maximum power to the road by starting at the first (lowest) gear when accelerating from a stop and utilizing all available gears of the transmission. An economy based shift schedule favors energy efficiency by skipping the first gear and optionally one or more higher-numbered gears in order to bias operation of the drive means toward lower speeds and higher torque output while reducing shift frequency. The invention provides for maintaining the number of gear ratio choices provided by a transmission having relatively many distinct gear ratios, while providing for reduced frequency of shifting and driver choice of a shift schedule favoring either performance or economy.

5 Claims, 7 Drawing Sheets

METHODS FOR OPTIMIZING THE EFFICIENCY OF A SERIES HYBRID VEHICLE WITH MULTI-GEAR TRANSMISSION

BACKGROUND OF THE INVENTION

1. Technical Field

Embodiments of the present disclosure are related generally to hybrid vehicles, and in particular to those that employ a drivetrain that includes a multi-gear transmission.

2. Description of the Related Art

Motor vehicles are commonly powered by an internal combustion engine (ICE) that is mechanically connected to the drive wheels through a multi-gear transmission. A multi-gear transmission is characterized by the availability of multiple distinct gear ratios, or "gears", at which it may transmit mechanical power from the engine to the wheels.

Gear ratio is commonly defined as the ratio of input speed to output speed. In a conventional motor vehicle, input speed is simply the engine speed, while output speed relates to the wheel speed or vehicle speed (possibly as modified by an additional gear ratio of a differential or final reduction gear residing downstream). To determine output speed, input speed is divided by the gear ratio. To determine output torque, input torque is multiplied by the gear ratio. Therefore the speed of the engine and the torque output to the wheels may be controlled by selecting among the various gear ratios offered by the transmission.

The gear ratios offered by a multi-gear transmission are commonly numbered sequentially, from a lowest-numbered (or "low") gear at which the gear ratio is the largest of all the gears, to a highest-numbered (or "high") gear at which the gear ratio is smallest. The present application follows this convention, thus reference to a "lowest-numbered" gear means the gear at which the gear ratio is the largest of all the gears, etc. Shifting the transmission from a given gear to a higher-numbered gear is referred to as an upshift, and shifting from a given gear to a lower-numbered gear is referred to as a downshift.

It follows that at a given vehicle speed, a low-numbered gear is associated with higher engine input speeds and higher torque outputs, and a high-numbered gear is associated with lower engine input speeds and lower torque outputs. The scheduling of upshifts and downshifts therefore affects the performance and efficiency of the vehicle. The practice of delaying an upshift until relatively higher engine speeds are reached tends to promote torque availability at the wheels, but causes the engine to run at relatively higher and less efficient speeds. Similarly, advancing an upshift to occur at lower engine speeds tends to cause the engine to run at relatively lower and more efficient speeds, but reduces torque availability at the wheels.

Automatic and automated manual transmissions are automatically shifted to a selected gear number by a shift controller. The gear number is typically selected by reference to a shift schedule. A shift schedule is a rule that relates a set of operating regions to a set of target gear numbers. Operating regions are typically defined in terms of vehicle speed and throttle position. The assignment of a specific gear number to a specific operating region determines the scheduling of upshifts and downshifts and therefore determines vehicle performance and fuel efficiency. A shift schedule may be designed to balance these conflicting objectives as well as possible, or to favor one objective over the other. Devising a single shift schedule that properly balances these conflicting concerns can be a challenge.

When designing a shift schedule, it should be taken into account that every gear shift is likely to be accompanied by a brief torque interruption to the wheels, a noticeable change in acceleration, and a change in speed of the engine, all of which may be noticed by the driver and detract from overall feel and drivability. For these reasons shifting should occur only where the performance or efficiency benefits justify the effect on drivability.

A shift schedule should also account for the fact that in some circumstances, such as under high load, shifting to a higher gear number may prevent the vehicle from further accelerating or even maintaining its speed. This is because the smaller gear ratio associated with the higher gear number reduces torque output at the wheels. The resultant increase in necessary input torque from the engine may approach or exceed its maximum torque output at the indicated engine speed.

Similarly, shifting to a lower-numbered gear also presents a possibility of overspeeding the engine. This latter concern is lessened to some degree by the inherent inertia and friction of an internal combustion engine, which may result in an engine braking effect, preventing runaway. However, this concern remains important for small engines of low inertia, or drive means such as electric or hydraulic motors which have much lower inertia than a typical ICE.

Beyond these concerns, the primary goal of a shift schedule is to provide desired performance at an acceptable efficiency. Because the efficiency and maximum torque of an ICE can vary significantly with operating speed, the more gears that are available the more effective an operating point can be found. Also, the relatively large inertia of an ICE imposes practical limits on the allowable speed change between gears, and the allowable speed range within a given gear, therefore favoring gear changes of a relatively small magnitude. These factors have tended to encourage the use of a transmission with four to six distinct gear ratios, and a shift schedule that utilizes each available ratio in sequence.

Best practices for developing a shift schedule for a transmission connected to an ICE on a conventional vehicle are well understood, and most shift schedules so developed are well adapted to the specific behavior and limitations of an ICE. The design of shift schedules for hybrid vehicles is not as well established. In particular, series hybrid vehicles that include a multi-gear transmission driving the wheels are likely to pose a different set of issues and limitations to the design of a shift schedule.

For example, with regard to shifting, the primary difference between conventional and hybrid vehicles is related to the way in which the internal combustion engine (ICE) is utilized. A series hybrid vehicle utilizes a secondary drive means to drive the wheels, such as a hydraulic or electric motor. The engine is freed from driving the wheels, allowing it to follow a more optimal duty cycle that is independent of the power demanded at the wheels. Having lower inertia than an ICE, a hydraulic or electric motor may take on a greater change in speed before impacting the noise or vibration of the vehicle, meaning that a larger range of operating speeds can be served by a single gear ratio. Similarly, the lower inertia may support a larger allowable speed change to result from a shift, meaning that a larger difference between each sequential gear ratio may be accommodated. Finally, the efficiency of an electric or hydraulic motor tends to be much less sensitive to speed and load than an ICE, which means that an equivalent degree of speed and torque optimization may be achieved with a smaller number of gear ratios. These factors mean that the drive means may in many cases operate without a multi-gear transmission, and may instead have a single-gear transmission, or a dual-gear transmission operating on very simple shift schedule.

On the other hand, there remain opportunities to optimize the efficiency and cost of a hybrid vehicle, while maintaining acceptable torque loads and response, by including a multi-gear transmission with an appropriate shift schedule. For example, an electric motor driving through a single-gear transmission will encounter significant portions of its duty cycle at efficiencies far below the peak efficiency, particularly at low speeds and loads. Sensitivity to speed and load, although diminished, is still a significant factor, and may benefit from retaining a choice of multiple gear ratios at which to operate the motor.

It is known to define a plurality of predetermined shift schedules each favoring a different balance of performance and efficiency, or each being optimized for different loading conditions, for automatic selection by a controller in response to sensed loading or other conditions for conventional vehicles. For example, the load or mass of the vehicle, or the road grade, may be sensed by a sensing means and fed to a controller that chooses a schedule designed to maintain performance when the load is particularly large or the grade is steep. Or, when the vehicle is lightly loaded, a shift schedule optimized for economy might be selected by the controller. However, applicant is unaware of any prior attempt to optimize the use of multiple shift schedules with a series hybrid vehicle.

OBJECT OF THE INVENTION

The applicant has recognized that the various factors cited above potentially make the shift behavior for a hybrid vehicle more flexible than for an ICE in a conventional vehicle. For example, using a transmission with multiple gears, one could optionally skip certain gears under certain conditions. For example, the lowest-numbered gear could be skipped when accelerating from a stop, in order to improve efficiency. Alternatively, one or more higher-numbered gears could be skipped at higher speeds. Additionally, a plurality of distinct shift schedules might be employed, being optimized for different performance goals. For example, a four-gear transmission could be subject to two different shift schedules, one an economy schedule that utilizes only two of the four gears while skipping the others, to improve efficiency, or simply to provide the better drivability of a two-gear transmission (that is, fewer shifts); the other a performance shift schedule that utilizes all of the gears.

The flexibility in shifting a series hybrid also may relax the need for fully automated control of the shift schedule, allowing the driver to take a more active part in determining how the transmission should behave. Many drivers have an active interest in the performance and economy of the vehicle being driven, and will be aware of the impact of operating conditions on likely performance or efficiency for a specific trip. For example, if the driver is facing an unusual amount of highly competitive traffic, or is hurried in making the next destination, or if fuel costs are unusually low, these facts could cause the driver to prefer a performance based shift schedule even if the physical load or other physically measurable parameters would ordinarily suggest an economy based schedule in a fully automated shift schedule. Or conversely, if the driver encounters an unusually empty road, or has an abundance of time to reach the destination, or is trying to conserve fuel due to a low fuel tank or a lack of likely fueling opportunities, these facts could cause the driver to prefer an economy based shift schedule even if physical parameters such as vehicle weight would indicate a performance based schedule would ordinarily be preferable. Fully automated selection of a shift schedule would not be able to recognize these unique conditions, and there would be an advantage in allowing the driver to provide such input. Such interactive features could also enhance the marketability of the vehicle.

It is therefore an object of the present invention to further improve the efficiency, performance, and drivability of series hybrid vehicles by providing methods for the control of multi-gear transmissions in a series hybrid vehicle.

BRIEF SUMMARY OF THE INVENTION

The invention concerns a method of shifting a drive means (such as a hydraulic or electric motor) in a series hybrid vehicle through an automatic or automated manual transmission having at least two distinct gear ratios. One feature of the invention over the prior art is the use of driver commanded input toward determining which of a plurality of available shift schedules will be followed in shifting the transmission.

Additionally, it is an invention of the applicant that one or more of the shift schedules skip one or more available gear ratios.

In one embodiment, two predetermined shift schedules for a multi-gear transmission are provided for driver selection, one favoring performance and utilizing all available gears, and the other favoring fuel economy and skipping the lowest-numbered gear.

In another embodiment, two predetermined shift schedules for a multi-gear transmission are provided for driver selection, one favoring performance and utilizing all available gears, and the other favoring fuel economy and skipping at least one higher-numbered gear.

In a preferred embodiment, three predetermined shift schedules for a multi-gear transmission are provided for driver selection, one favoring performance and utilizing all available gears, another balancing performance with economy and skipping the lowest-numbered gear, and another favoring economy and skipping the lowest-numbered gear and one or more higher-numbered gears.

Additional embodiments include any number of predetermined or dynamically computed shift schedules for driver selection, each schedule variously favoring or balancing performance and/or economy by any combination of: utilizing all gears, skipping the lowest-numbered gear, skipping at least one higher-numbered gear, or skipping the lowest-numbered gear and at least one higher-numbered gear.

DETAILED DESCRIPTION OF THE INVENTION

Additional background regarding hydraulic hybrid vehicles may be found in U.S. Pat. No. 7,456,509 entitled METHODS OF OPERATING A SERIES HYBRID VEHICLE; U.S. Pat. No. 6,876,098 entitled METHODS OF OPERATING A SERIES HYBRID VEHICLE; U.S. Pat. No. 6,719,080 entitled HYDRAULIC HYBRID VEHICLE; and U.S. Pat. No. 5,495,912 entitled HYBRID POWERTRAIN VEHICLE; all issued to applicant and incorporated herein by reference in their entireties.

Figure 1:
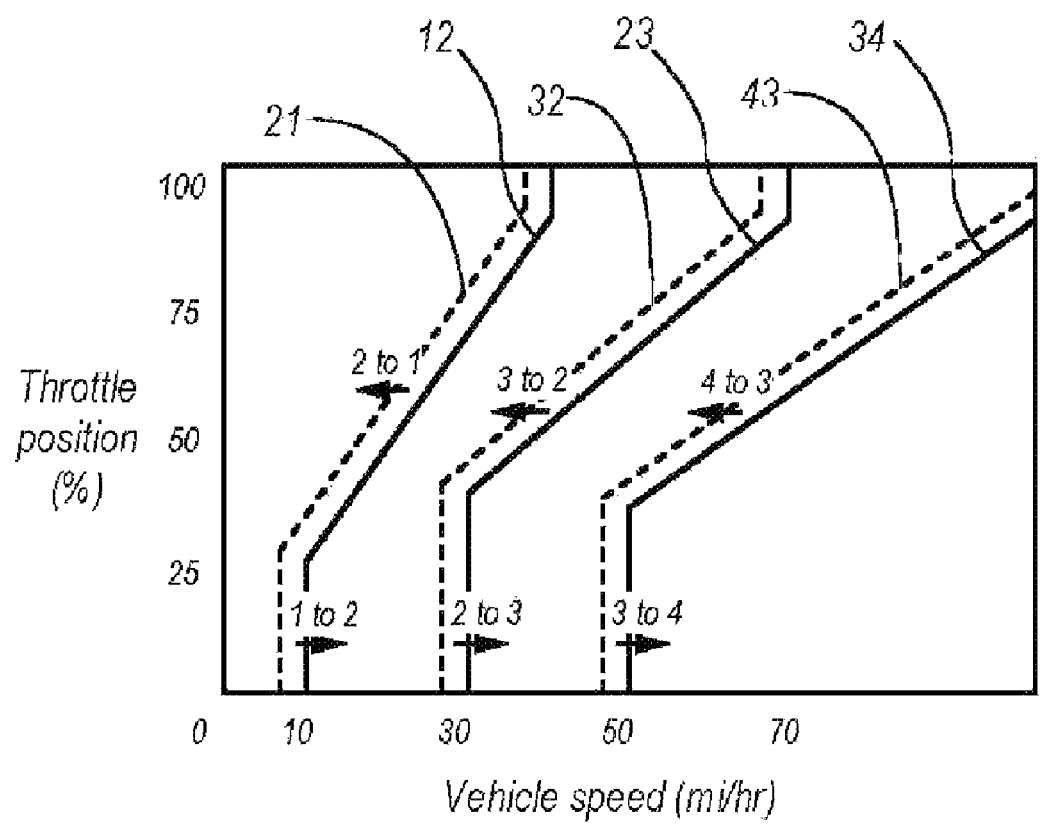
FIG. 1 is an example of a shift schedule as might be employed for an automatic transmission in a conventional ICE-powered vehicle or a hybrid vehicle of the prior art.

FIG. 1 depicts an example of a typical shift schedule for a four-gear automatic transmission connected to an internal combustion engine. Upshifts are indicated by solid lines, and downshifts are indicated by dashed lines. The upshift and downshift lines each represent a collection of operating points, in terms of vehicle speed and throttle opening percentage, at which the transmission should leave a current gear number and be shifted to another. For example, line 21 indicates the set of operating points at which, if the transmission is currently in gear 2, a downshift to gear 1 should be performed. The current gear indicates which pair of lines are active at a given time, forming between them a region in which the current gear is the preferred gear. For example, if the transmission is currently in gear 2, then the space between lines 21 and 23 represents an operating region in which gear 2 is the preferred gear. If the operating condition exits this region by crossing line 21, a downshift to gear 1 is indicated. If the operating condition crosses line 23, an upshift to gear 3 is indicated. Once the transmission has entered a new gear, a different pair of lines becomes active with respect to determining the next shift. For example, if the transmission shifts to gear 3, lines 32 and 34 then become active.

In FIG. 1, it can be seen that the downshift lines are similar in shape to the upshift lines but are laterally separated. Downshift and upshift lines are commonly separated in this manner to provide for a degree of hysteresis, to prevent repeated shifting if operating conditions happen to linger near a boundary between zones. Downshift and upshift lines may of course also have variations meant to provide for different shift behavior during deceleration as opposed to acceleration. In the remainder of this disclosure, only upshift lines will be depicted, with the understanding that downshift lines will also exist in any shift schedule and will benefit from the same advantages disclosed with reference to upshift lines.

It can be seen that in FIG. 1, the lines generally slope upward and to the right, indicating that the greater the throttle position (i.e. power demand), the greater a vehicle speed may be attained before an upshift will occur. By delaying upshifts in this way when power demand is high, the lower-numbered gear remains active for a longer portion of an acceleration, allowing the engine to operate at generally higher speeds, thereby remaining capable of delivering a greater degree of increase in power to the road at any given time. At lower throttle positions, upshifting will occur at lower speeds. This takes advantage of the lower power demand by operating the engine at lower, more fully torque-loaded speeds in order to improve efficiency. However, in this condition the engine operates closer to its maximum torque capability at the given speed, and therefore is less capable of increasing its power output without downshifting. Also as previously mentioned, the larger average gear ratio provided by this bias toward lower-numbered gears increases the average torque output at the wheels.

Figure 2:
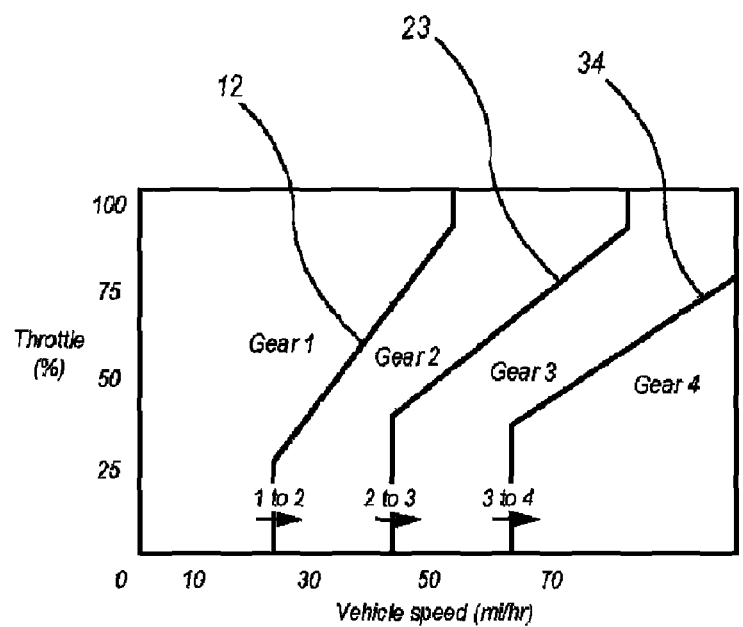
FIG. 2 is an example of a shift schedule optimized for performance, as may be found in the prior art.

FIG. 2 depicts a sample shift schedule that favors performance and acceleration. It can be seen that each shift line has been moved to the right to a region of higher vehicle speed, thereby delaying shifts in order to increase the average speed of the engine and the average torque delivered to the wheels during the acceleration. The higher average speed of the engine and the greater degree of torque multiplication due to the bias toward larger gear ratios tends to produce a greater amount of torque at the wheels, allowing for rapid acceleration and responsiveness.

Figure 3:
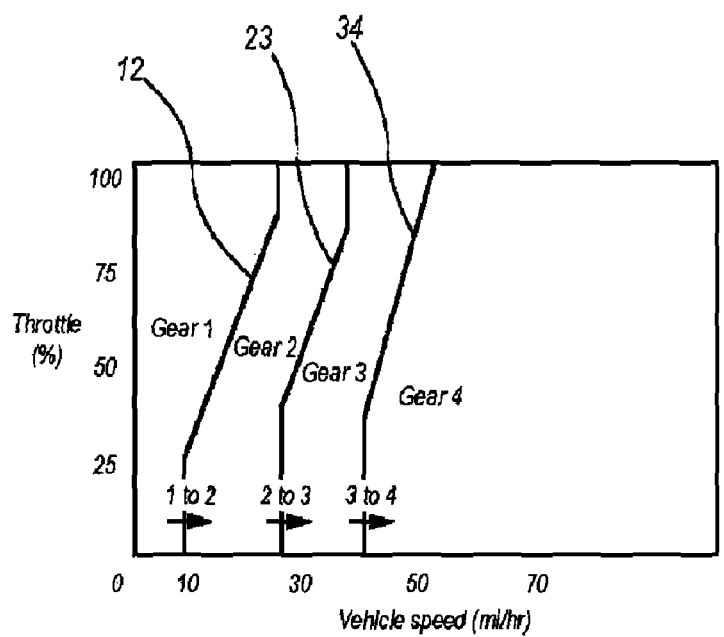
FIG. 3 is an example of a shift schedule optimized for efficiency, as may also be found in the prior art.

FIG. 3 depicts a similar shift schedule, but favoring efficiency rather than performance. It can be seen that each shift line has been moved to the left to a region of lower vehicle speed, thereby advancing each upshift to occur at lower vehicle speeds than before. Because this causes the engine to operate at a lower average speed, and because the smaller average gear ratio reduces the torque delivered to the wheels, the vehicle is not capable of as rapid acceleration or responsiveness. However, the lower speeds and higher torque loading of the engine tends to improve its efficiency.

Being designed for use with an ICE in a conventional non-hybrid vehicle, these shift schedules depicted in FIGS. 2 and 3 begin to exhibit shortcomings when applied to a series hybrid vehicle. First, considering a hydraulic motor as the drive means, it may be necessary to de-stroke the pump/motor to zero displacement prior to every shift, and re-stroke it after the shift has been successfully completed, in order to prevent the motor from running away in speed while briefly unloaded during the shift. Each displacement-stroking event requires a hydraulic actuator to engage the displacement control, consuming a small but potentially significant amount of pressurized fluid equal to the volume of the actuator cylinder, and therefore impacting overall efficiency of the system. This provides an additional motivation to minimize the frequency of shifting below that frequency deemed acceptable for an ICE. Second, the relatively flat efficiency map of a hybrid drive motor, whether hydraulic or electric, does not necessarily require the same degree of control over operating speed that would be offered by utilizing four or more gear ratios. Instead, a smaller number of utilized gears, and therefore a smaller potential frequency of shifting, may yield an equivalent degree of efficiency optimization. Both of these factors suggest that a shift schedule for a series hybrid vehicle may benefit from either having fewer gear stops (i.e. fewer gears in the transmission), or by skipping some of the available gear stops.

The invention will now be described by example of several classes of embodiments. The embodiments described herein are by way of example, and are disclosed for the purpose of relating a general understanding of the invention.

Figure 4:
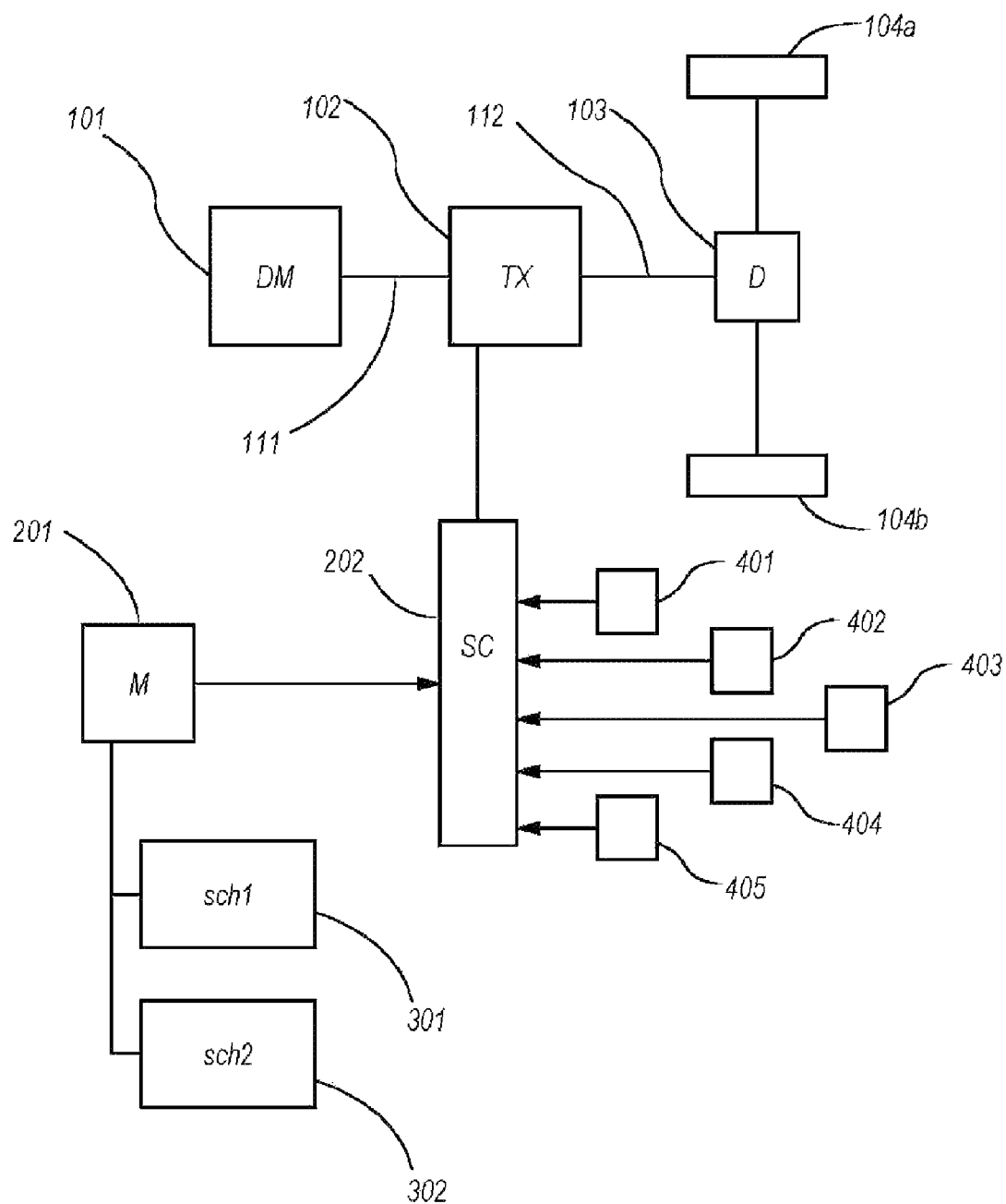
FIG. 4 is a block diagram depicting major components of a series hybrid vehicle according to the invention.

Referring now to FIG. 4, in all embodiments herein described, a series hybrid vehicle is provided, having at least one drive means 101 (such as for example a hydraulic or electric motor), driving shaft 111, which in turn drives the input of automatic or automated manual multi-gear transmission 102, driving transmission output shaft 112 through optional gear reduction 103 and a plurality of drive wheels represented here by drive wheels 104a and 104b. Shift controller 202 is provided for selecting a shift schedule, selecting a gear number for the transmission, and for actuating the selected gear number. Memory storage means 201 stores information describing a plurality of shift schedules here represented by the two shift schedules 301 and 302. Shift controller 202 selects a shift schedule at least in part by reference to signals provided by any or all of accelerator pedal position sensor 401, optional vehicle loading sensor 402, driver shift style preference selector 403 (also referred to herein as a means for driver selection of a shift style preference), optional power demand sensor 404, and vehicle speed sensor 405. Power demand sensor 404 may represent an equivalent of throttle position, such as a quantity representing displacement of a hydraulic pump/motor, or the current draw of an electric motor. Alternatively power demand sensor 404 may be omitted and instead accelerator pedal position sensor 401 used to provide a power demand signal. Shift controller 202 also selects a gear number by reference at least to the selected shift schedule and to signals from power demand sensor 404 (or alternatively accelerator pedal position sensor 401) and vehicle speed sensor 405.

Driver shift style preference selector 403 includes a tactile input means (not shown) such as one or more buttons, levers, pedals, or interactive regions presented on a computer input screen, by voice activation, or by any other means that allows the driver to communicate a shift style preference to the shift controller 202. For example, if three shift styles corresponding to three distinct shift schedules are provided, selector 403 may present three options for mutually exclusive selection, called for example, D1, D2, and D3.

Optional vehicle loading sensor 402 includes means to estimate any of: vehicle mass, road grade, or other physical property that represents a general relative level of tractive load being experienced or likely to be experienced by the vehicle. For example, vehicle mass may be estimated by means of a load cell, or by comparing actual acceleration to theoretical acceleration as a function of the torque applied to the drive wheels (from the relationship F=ma), or by other means known in the art.

Optionally the controller may override the driver selection of a specific shift style preference if, for example, it senses loading conditions (for example, by means of vehicle loading sensor 402) that would preclude effective use of the shift schedule preference. For example, if the vehicle is unusually heavily loaded, or traversing a steep uphill grade, an economy based shift schedule might stall the vehicle and therefore could be prohibited by the controller even if selected by the driver. Similarly, if the vehicle is sufficiently lightly loaded, or traversing a steep downhill grade, such that a performance based schedule would provide no advantage over an economy schedule, an economy schedule might be selected by the controller even if a performance based preference was indicated by the driver. For clarity, the remainder of the discussion will describe an implementation in which the driver has sole power to select the shift schedule, with the understanding that optionally the controller may override the selection when necessary.

A first class of embodiments is characterized by the skipping of the lowest-numbered gear in at least one of the plurality of shift schedules.

Figure 5A:
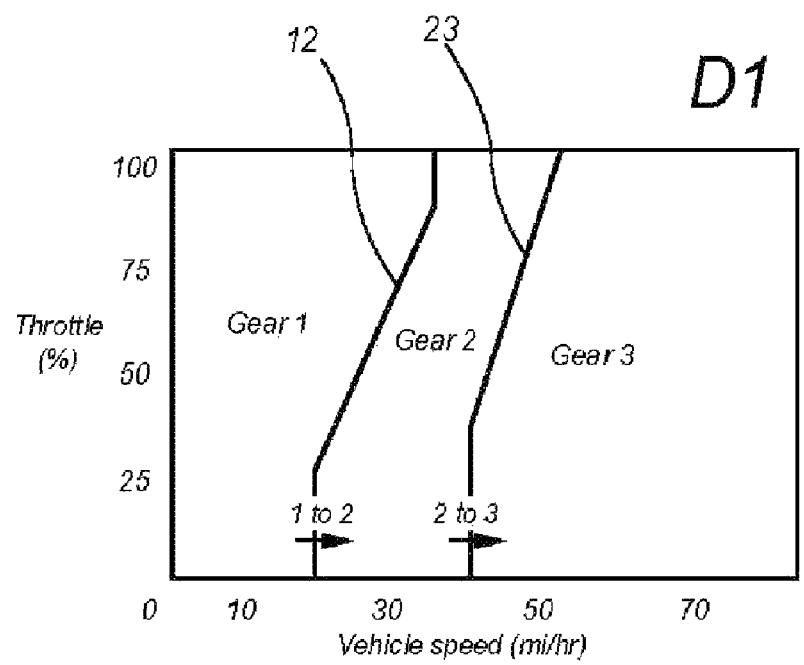
FIGS. 5a-5b depict a pair of shift schedules according to a first embodiment of the invention.
Figure 5B:
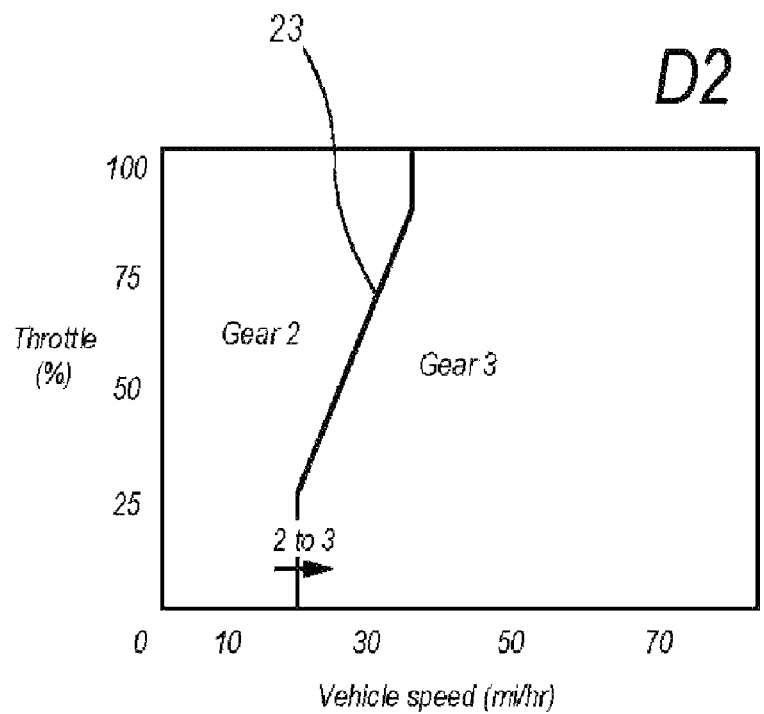

Referring now to FIGS. 5a and 5b, two driver-selectable shift schedules D1 and D2 are seen, pertaining (for this example) to a transmission having three distinct gear ratios numbered gear 1 (with the largest gear ratio) through 3 (with the smallest gear ratio). Although specific speeds and throttle positions are labeled on the respective axes for clarity, the values depicted are for example only and are not to be taken as prescriptive. Shift schedule D1 (FIG. 5a) favors performance, favors higher motor output speeds, and utilizes all available gears. Shift schedule D2 (FIG. 5b) favors economy, favors lower motor output speeds, and skips the lowest-numbered gear. Accordingly, shift schedule D1 is seen to include upshift lines 12 and 23. Line 12 delineates a shift from gear 1 to gear 2, and line 23 delineates a shift from gear 2 to gear 3. Both lines 12 and 23 are sloped and positioned so as to favor shifting at relatively high operating speeds that increase with throttle position. Therefore D1 is a performance based shift schedule. By contrast, D2 is an economy based shift schedule. It consists only of line 23, delineating a shift from gear 2 to gear 3. Gear 1 is not utilized. Therefore under schedule D2, when the vehicle starts from a stop or accelerates from a low speed, gear 1 is skipped and gear 2 is instead utilized. Gear 2 yields to gear 3 at relatively low operating speeds compared to D1. On downshift, the same set of two gears are invoked and gear 1 is not utilized.

The key feature of this class of embodiments is in providing the shift schedule D2 in which the lowest-numbered gear (with the largest gear ratio) is skipped. This class of embodiments includes all variations in which additional higher-numbered gears are available and utilized. For example, in a four-gear transmission, shift schedules D1 and D2 would each include a gear 4 and a line 34 at which gear 3 yields to gear 4.

A second class of embodiments is characterized by the skipping of at least one higher-numbered gear than the lowest-numbered gear in at least one of the plurality of shift schedules. This class defines a population of variations which differ in the quantity and identity of the higher-numbered gears being skipped.

Figure 6A:
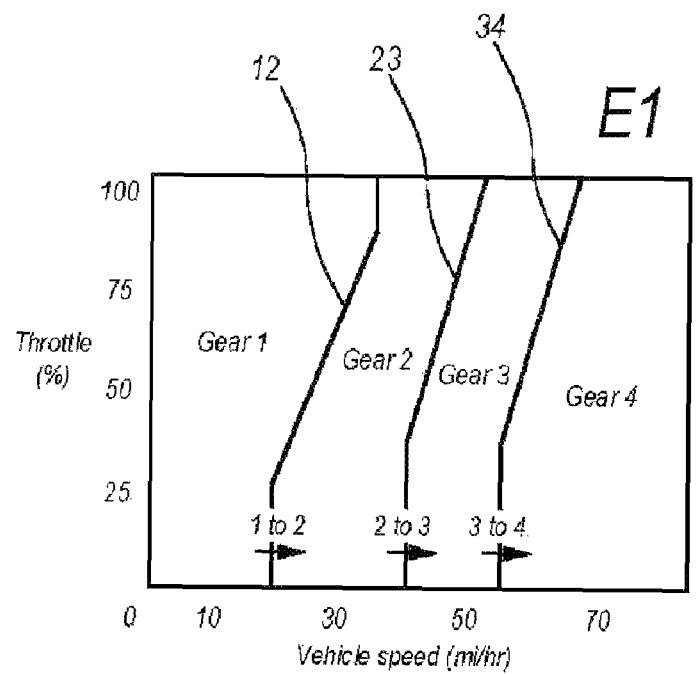
FIGS. 6a-6b depict a pair of shift schedules according to a second embodiment of the invention.
Figure 6B:
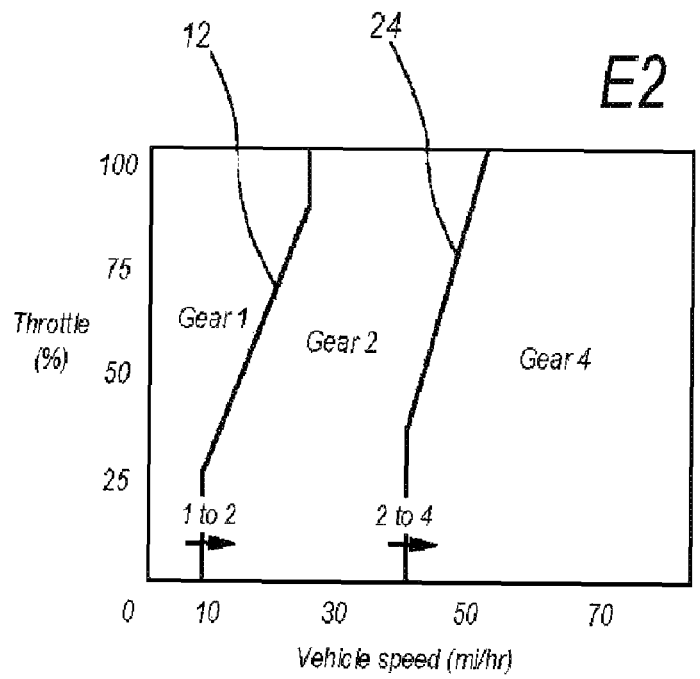

Referring now to FIGS. 6a-6b, shift schedules E1 and E2 are depicted, for a transmission having four distinct gear ratios. Again, the specific speed and throttle values depicted are for example only. E1 favors performance and utilizes all gears. E2 favors economy, and skips an intermediate-numbered gear (gear 3 for this example). Accordingly, shift schedule E1 is seen to include upshift lines 12, 23, and 34. Line 12 delineates a shift from gear 1 to gear 2, line 23 delineates a shift from gear 2 to gear 3, and line 34 delineates a shift from gear 3 to gear 4. Lines 12, 23, and 34 are sloped and positioned so as to favor shifting at relatively high operating speeds that increase with throttle position. Therefore E1 is a performance based shift schedule. By contrast, E2 is an economy based shift schedule. It consists of line 12, delineating a shift from gear 1 to gear 2, and line 24, delineating a shift from gear 2 to gear 4. Gear 3 is not utilized. Optionally, one or both of lines 12 and 24 are moved to the left, to cause shifting to occur at lower speeds than in schedule E1.

On starting from a stop, if the driver or controller has selected E1, all gears are utilized and the shift sequence progresses through all gears from gear 1 to gear 4 as speed sufficiently increases. If the driver or controller has selected E2, on starting from a stop, gear 1 is selected, and the shift sequence additionally visits only gear 2 and gear 4 as speed sufficiently increases. On downshift, the same set of three gears are invoked and gear 3 is not utilized.

A third class of embodiments is characterized by the skipping of the lowest-numbered gear in at least one of a plurality of shift schedules, and the skipping of at least one higher-numbered gear than the lowest-numbered gear in at least one of a plurality of shift schedules. This class defines a population of variations which differ in the quantity and identity of higher-numbered gears skipped and whether or not the first (lowest-numbered) gear is skipped.

Figure 7A:
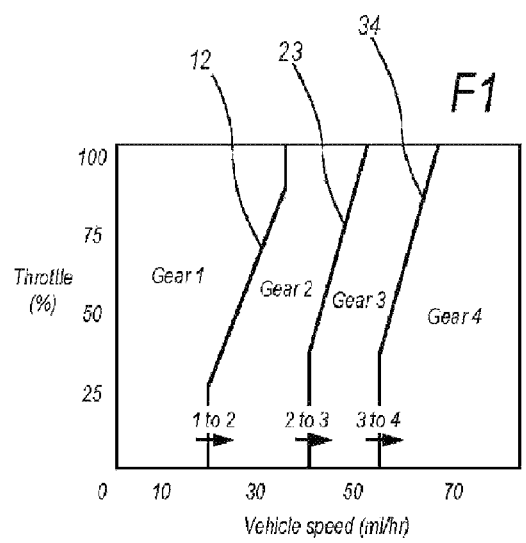
FIGS. 7a-7e depict a group of shift schedules according to a third embodiment of the invention.
Figure 7B:
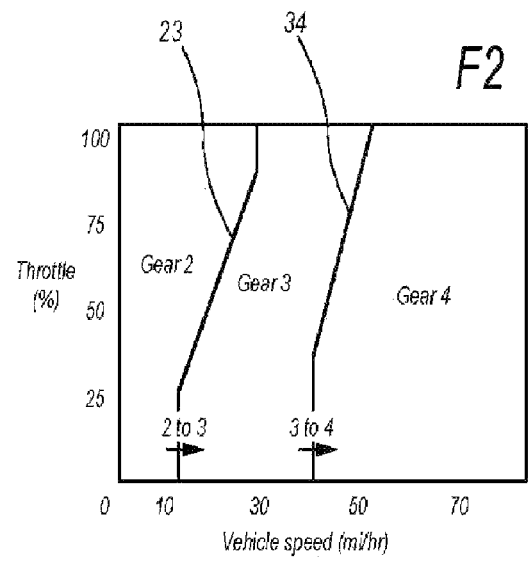
Figure 7C:
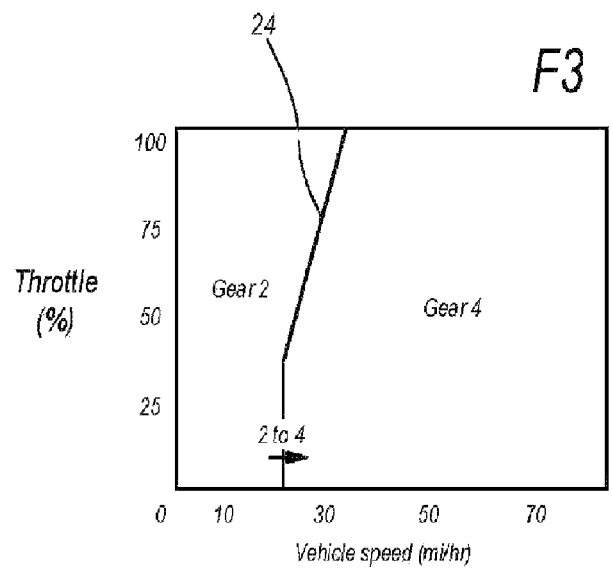

Referring now to FIGS. 7a-7c, another example is provided having a series of three shift schedules F1, F2, and F3 for a transmission having four distinct gear ratios. Again, the specific speed and throttle values depicted are for example only. F1 favors performance and utilizes all gears. F2 favors moderate performance with moderate economy, and skips the lowest-numbered gear (gear 1), utilizing all other gears. Optionally the shift lines may be moved to the left to cause shifting to occur at lower speeds than in F1. Schedule F3 favors economy and skips the lowest-numbered gear (gear 1) as well as gear 3, utilizing only gears 2 and 4. Optionally the shift line may be moved to the left to cause shifting to occur at speeds lower than those of F1 or F2.

Accordingly, shift schedule F1 is seen to include upshift lines 12, 23, and 34. Line 12 delineates a shift from gear 1 to gear 2, line 23 delineates a shift from gear 2 to gear 3, and line 34 delineates a shift from gear 3 to gear 4. Lines 12, 23, and 34 are sloped and positioned so as to favor shifting at relatively high operating speeds that increase with throttle position. Therefore F1 is a performance based shift schedule. By contrast, F2 balances economy and performance. It consists of line 23, delineating a shift from gear 2 to gear 3, and line 34, delineating a shift from gear 3 to gear 4. Gear 1 is not utilized. F3 is an economy shift schedule. It consists only of line 24, delineating a shift from gear 2 to gear 4. Gears 1 and 3 are not utilized.

Figure 7D:
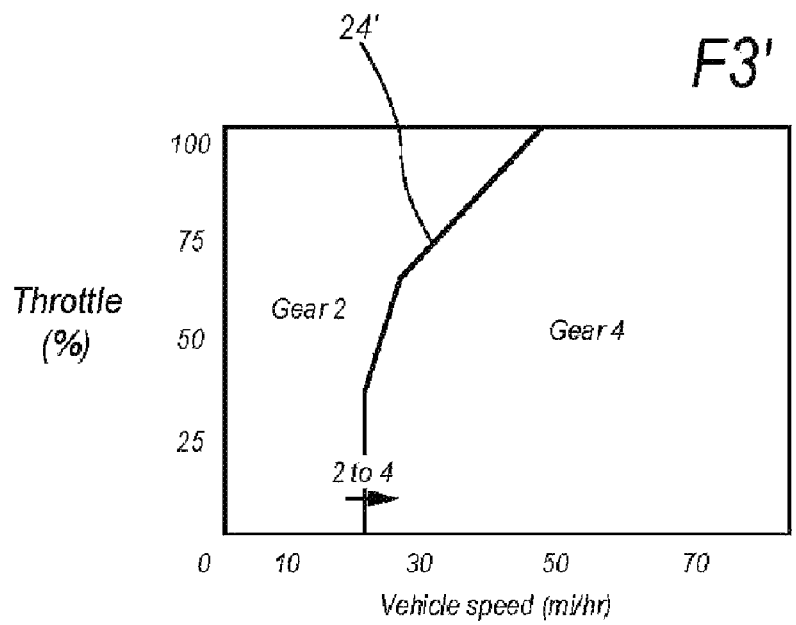

Referring now to FIG. 7d, another option is depicted. It can be seen that shift line 24' now bends to the right at higher throttle percentages, delaying the shift from gear 2 to gear 4 until higher speeds are attained relative to the line 24 of FIG. 7c. This option still provides good and economical performance in urban driving while providing higher torque when desired by delaying the shift point when the throttle position indicates that high torque is demanded.

Figure 7E:
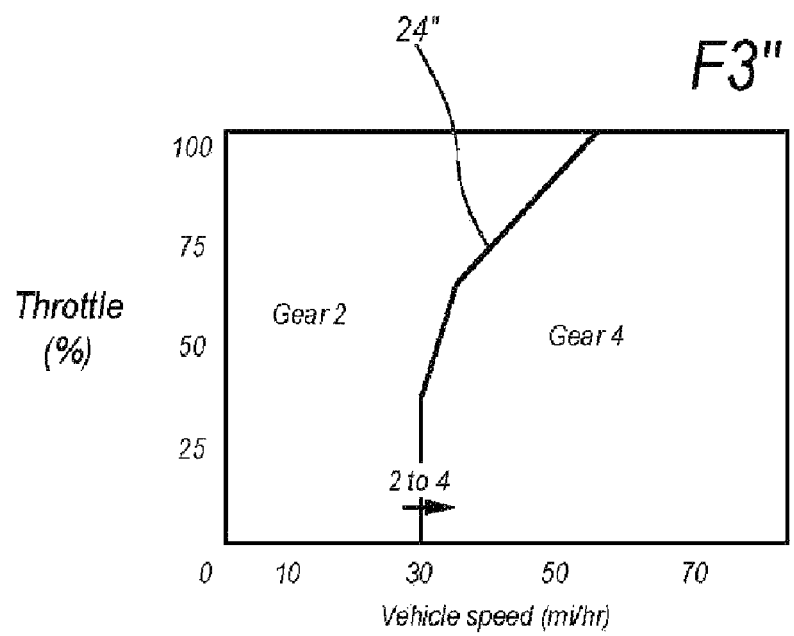

Referring now to FIG. 7e, yet another option is depicted. In this case line 24" is shifted farther to the right, delaying the shift point to higher speeds across the entire throttle range.

Like the other shift lines previously presented, the shift lines 24' and 24" of FIGS. 7d and 7e may be provided as shift schedule options subject to driver choice. This would be of particular interest if the drive unit is relatively large (such as may be needed for heavy series hybrid motor vehicles), because it provides a better opportunity to operate even a somewhat oversized drive unit at the largest possible displacement by providing more options for operating it at a relatively lower speed. For example, choosing shift line 24' of FIG. 7d would on average operate the large drive unit at a lower speed by tending to shift to the higher-numbered gear sooner, and would be appropriate for normal driving, while shift line 24" of FIG. 7e could still be chosen for greater performance.

Although the shift schedules presented in FIG. 7c-e were discussed in reference to a transmission with three or more gear ratios in which one or more gear ratios are skipped, it is of course possible to apply some of the concepts in these schedules to a two-gear transmission having no skipped gear ratios. For example, rather than representing a shift from a gear 2 to gear 4, lines 24' and 24" of the respective Figures could represent different shift schedules relating to a shift from a gear 1 to a gear 2 of a two-gear transmission.

Furthermore, the schedules of FIG. 7d-e could be applied advantageously to a vehicle configuration in which two or more drive motors drive the vehicle through a multi-gear (two or more gear ratio) transmission. Examples of this type of configuration are provided in commonly-assigned U.S. Pat. Nos. 6,719,080 and 7,337,869, both incorporated herein by reference. In such a system, a single drive unit could be employed at low to moderate torque demands, and both drive units employed to serve high torque demands, with both units driving the wheels through a common two-gear transmission. In this regard, line 24' of FIG. 7d might be preferred when two drive units are in operation in this configuration. This is because it is desirable to maximize displacement of the unit or units that are in use in order to maximize their efficiency. In general, the displacement at which a pump/motor delivers torque may be increased by reducing the speed at which it delivers it. This corresponds to operating the unit(s) at the lowest speed made available by the gear ratios offered by the transmission while supporting the necessary torque output. When only a single drive motor of the pair is delivering torque, it is more likely to naturally operate near its maximum displacement (because of its small total displacement compared to that of both units). Therefore it is less critical that the speed be minimized in order to maximize displacement. Therefore the delayed shift line 24" of FIG. 7e tends to be applicable to single unit operation because its delayed shift point allows the unit to operate at generally higher speeds than line 24' of FIG. 7d. However, when both drive units are delivering torque, they share the total load between them, and it is less likely that both units will naturally reach their maximum displacements except at times of the very highest torque demand, which is relatively rare. Therefore it is more important to generally minimize the speed at which they operate by shifting into a higher-numbered gear at relatively lower speeds. Thus, line 24' of FIG. 7d might be preferred when two units are in operation.

It will now be apparent to anyone skilled in the art that many other variations are possible in the spirit of the examples depicted, distinguished, for example, by the number of gears in the transmission, the quantity of distinct shift schedules provided, and the quantity and identity of the gears that are skipped in each of the provided shift schedules.

While the examples described above have been presented in terms of gear visitation during an upshifting sequence of increasing vehicle speed, the principles disclosed also apply to gear visitation during a downshifting sequence: As is known in the art, the downshift lines, although not depicted in the examples, may be of similar shape to the upshift lines and reside in an offset position from their upshift counterparts, or may be of different shape.

The invention claimed is:

1. A system for establishing a transmission gear position in a series hybrid vehicle having a drive means coupled to a multi-gear transmission, comprising:
 a vehicle speed sensor;
 an accelerator pedal position sensor;
 a memory storage means for storing information regarding a plurality of shift schedules for the series hybrid vehicle, including at least a first shift schedule representing a first shift style preference and a second shift schedule representing a second shift style preference, wherein the first shift schedule provides that (i) upon initial acceleration from a stop, the lowest-numbered gear is selected, (ii) upshifting is based at least in part on accelerator pedal position, and (iii) upshifts are to the next-higher-numbered gear from the current gear number; and wherein the second shift schedule provides that (i) upon acceleration from a stop, the second to lowest-numbered gear is selected, (ii) upshifting is based at least in part on the accelerator pedal position, and (iii) upshifts are to a higher-numbered gear from the current gear number;
 means for driver selection of one of the said shift style preferences; and
 a shift controller for selecting between the first shift schedule and the second shift schedule based at least in part on the driver shift style preference selection.

2. The system of claim 1 additionally comprising:
 a vehicle loading sensor comprising means for determining vehicle mass or road grade; and wherein the shift controller selects between the first shift schedule and the second shift schedule based at least in part on the determined vehicle mass or road grade.

3. The system of claim 1, wherein the transmission has at least four forward gears and wherein the second shift schedule further provides that upshifts are to a gear number at least two gear numbers beyond the current gear.

4. The system of claim 1, wherein the second shift schedule provides for acceleration of the series hybrid vehicle from a stop to over 50 miles per hour with only one upshift in the transmission gear position.

5. A method for selecting a transmission gear position in a series hybrid vehicle having a drive means, a multi-gear transmission of at least two gears coupled to the drive means, and an accelerator pedal, comprising the steps of:

determining an accelerator pedal position;

determining a relative vehicle loading condition;

determining an operator choice of shift schedule;

selecting between a first shift schedule and a second shift schedule based at least in part on the accelerator pedal position, vehicle loading condition, and operator choice of shift schedules;

selecting the transmission gear number corresponding to the lowest-numbered gear upon starting the vehicle from a stop if the first shift schedule is selected; and selecting the transmission gear number corresponding to the second-to-lowest-numbered gear upon starting the vehicle from a stop if the second shift schedule is selected.

* * * * *